(12) United States Patent
Gauthier

(10) Patent No.: US 9,669,832 B2
(45) Date of Patent: Jun. 6, 2017

(54) PROXIMITY-BASED ENGINE CONTROL SYSTEM

(71) Applicant: Toyota Motor Engineering & Manufacturing North America, Inc., Erlanger, KY (US)

(72) Inventor: Christopher T. Gauthier, Redondo Beach, CA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 83 days.

(21) Appl. No.: 14/644,141

(22) Filed: Mar. 10, 2015

(65) Prior Publication Data

US 2016/0264139 A1    Sep. 15, 2016

(51) Int. Cl.
| | |
|---|---|
| *B60T 7/12* | (2006.01) |
| *B60W 30/16* | (2012.01) |
| *B60W 10/06* | (2006.01) |
| *B60W 30/09* | (2012.01) |
| *B60W 10/184* | (2012.01) |
| *B60W 30/18* | (2012.01) |

(52) U.S. Cl.
CPC .......... *B60W 30/16* (2013.01); *B60W 10/06* (2013.01); *B60W 10/184* (2013.01); *B60W 30/09* (2013.01); *B60W 30/18136* (2013.01); *B60W 2510/0604* (2013.01); *B60W 2520/10* (2013.01); *B60W 2540/12* (2013.01); *B60W 2550/10* (2013.01); *B60W 2550/302* (2013.01); *B60W 2550/308* (2013.01); *B60W 2710/0605* (2013.01); *B60W 2720/106* (2013.01)

(58) Field of Classification Search
CPC .............................. B60W 30/16; B60W 10/06
See application file for complete search history.

(56) References Cited

U.S. PATENT DOCUMENTS

| | | | |
|---|---|---|---|
| 4,751,856 A * | 6/1988 | Nakamura | B60K 17/3462 180/249 |
| 7,739,022 B2 | 6/2010 | Kobayashi et al. | |
| 8,000,874 B2 | 8/2011 | Tange et al. | |
| 8,326,481 B2 | 12/2012 | Kimura et al. | |

(Continued)

FOREIGN PATENT DOCUMENTS

KR    2008009474 A    1/2008

*Primary Examiner* — Adam Alharbi
(74) *Attorney, Agent, or Firm* — Christopher G. Darrow; Darrow Mustafa PC

(57) ABSTRACT

A vehicle and methods of proximity-based engine control for a vehicle as automatically implemented by a computing device are disclosed. One method includes determining a distance between the vehicle and a preceding obstacle. If the distance between the vehicle and the preceding obstacle is below a threshold distance, the method further includes determining whether a vehicle brake is being applied. If the vehicle brake is not being applied, the method further includes detecting a throttle position for an engine throttle. If the throttle position is above a threshold throttle position, the method further includes sending a command to modify the throttle position to a restricted throttle position. If the throttle position is above the threshold throttle position, the method can optionally include sending a command to modify ignition timing for a vehicle engine or sending a command to apply the vehicle brake.

20 Claims, 3 Drawing Sheets

(56) References Cited

U.S. PATENT DOCUMENTS

| | | | | |
|---|---|---|---|---|
| 2004/0085197 A1* | 5/2004 | Watanabe | ............... | B60T 7/22 340/435 |
| 2010/0318256 A1* | 12/2010 | Breuer | ............... | B60T 7/22 701/31.4 |
| 2011/0040467 A1* | 2/2011 | Breuer | ............... | B60T 7/22 701/96 |
| 2012/0226423 A1* | 9/2012 | Sekiguchi | ............... | B60T 7/22 701/70 |

* cited by examiner

PROXIMITY-BASED ENGINE CONTROL SYSTEM

BACKGROUND

Obstacle avoidance driver assistance systems are designed to modify vehicle behavior automatically if a vehicle encounters an obstacle in its path. If the obstacle is a preceding vehicle, and the vehicle encounters the preceding vehicle while accelerating or traveling with excessive speed, some driver assistance systems are designed to decelerate the vehicle automatically, for example, by counteracting driver inputs to an accelerator pedal with reactive force or by automatically applying the vehicle brakes. However, existing driver assistance systems are not designed to decelerate the vehicle through more direct interaction with the engine, for example, by sending commands to an engine controller related to throttle position or ignition timing.

SUMMARY

A vehicle including a computing device configured to implement a proximity-based engine control algorithm is disclosed. The computing device can determine the distance between the vehicle and a preceding obstacle, such as another vehicle, and if the distance is below a threshold distance, further determine whether a vehicle brake is being applied, for example, by a driver or by a driver assistance system. If the vehicle brake is not being applied, the computing device can detect a throttle position for an engine throttle, for example, to determine whether the vehicle is accelerating. If the throttle position is above a threshold throttle position, the computing device can send a command, for example, to an engine controller, to modify the throttle position to a restricted throttle position, a throttle position designed to reduce the acceleration of the vehicle.

In one implementation, a method of proximity-based engine control for a vehicle is disclosed. The method includes determining a distance between the vehicle and a preceding obstacle. If the distance between the vehicle and the preceding obstacle is below a threshold distance, the method further includes determining whether a vehicle brake is being applied. If the vehicle brake is not being applied, the method further includes detecting a throttle position for an engine throttle. If the throttle position is above a threshold throttle position, the method further includes sending a command to modify the throttle position to a restricted throttle position.

In another implementation, a computing device is disclosed. The computing device includes one or more processors for controlling operations of the computing device and a memory for storing data and program instructions used by the one or more processors. The one or more processors are configured to execute instructions stored in the memory to: determine a distance between the vehicle and a preceding obstacle. If the distance between the vehicle and the preceding obstacle is below a threshold distance, the computing device can determine whether a vehicle brake is being applied. If the vehicle brake is not being applied, the computing device can detect a throttle position for an engine throttle. If the throttle position is above a threshold throttle position, the computing device can send a command to modify the throttle position to a restricted throttle position.

In another implementation, a vehicle is disclosed. The vehicle includes an engine throttle, a vehicle brake, and a computing device in communication with the engine throttle and the vehicle brake. The computing device includes one or more processors for controlling operations of the computing device and a memory for storing data and program instructions used by the one or more processors. The one or more processors are configured to execute instructions stored in the memory to determine a distance between the vehicle and a preceding obstacle. If the distance between the vehicle and the preceding obstacle is below a threshold distance, the computing device can determine whether the vehicle brake is being applied. If the vehicle brake is not being applied, the computing device can detect a throttle position for the engine throttle. If the throttle position is above a threshold throttle position, the computing device can send a command to modify the throttle position to a restricted throttle position.

BRIEF DESCRIPTION OF THE DRAWINGS

The description herein makes reference to the accompanying drawings wherein like reference numerals refer to like parts throughout the several views, and wherein.

DETAILED DESCRIPTION

A vehicle and methods of controlling the engine of the vehicle based on proximity to preceding objects are disclosed. The engine control system is implemented by a computing device capable of determining the distance to preceding objects, determining whether a vehicle brake is being applied, and determining the throttle position of the engine throttle. If the distance to a preceding object, such as a preceding vehicle, is below a distance threshold, and if the vehicle brake is not being applied, the throttle position of the engine throttle is compared to a threshold throttle position. If the throttle position is above the threshold throttle position, the engine control system can modify the throttle position to a restricted throttle position, such as a position consistent with sustaining engine idle, in order to reduce the acceleration of the vehicle.

Figure 1:
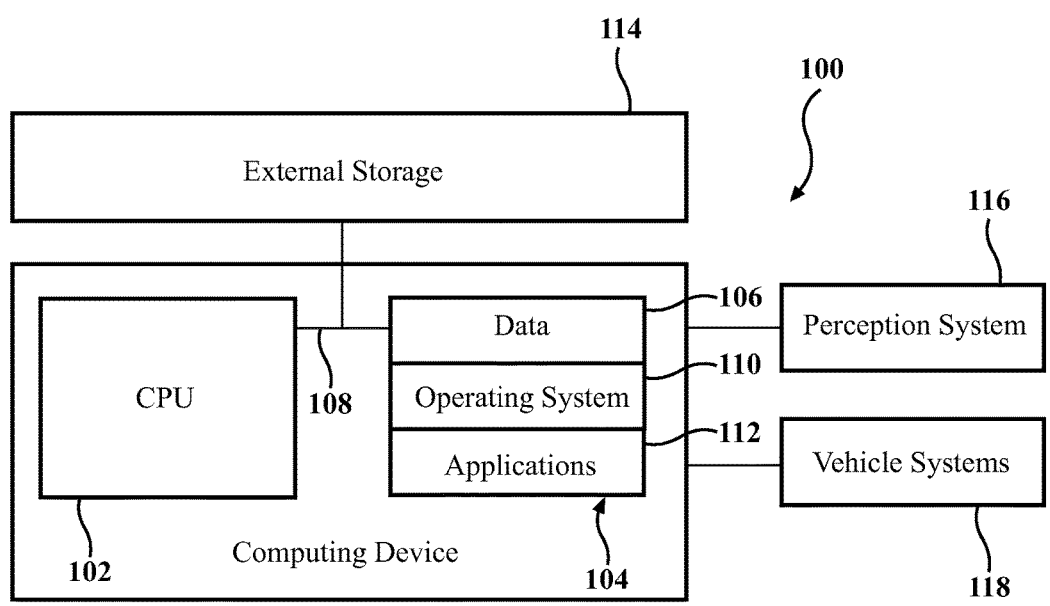
FIG. 1 is a block diagram of a computing device.

FIG. 1 is a block diagram of a computing device 100, for example, for use within a vehicle. The computing device 100 can be any type of vehicle-installed, handheld, or other form of single computing device, or can be composed of multiple computing devices. The processing unit in the computing device can be a conventional central processing unit (CPU) 102 or any other type of device, or multiple devices, capable of manipulating or processing information. A memory 104 in the computing device can be a random access memory device (RAM) or any other suitable type of storage device. The memory 104 can include data 106 that is accessed by the CPU 102 using a bus 108.

The memory 104 can also include an operating system 110 and installed applications 112, the installed applications 112 including programs that permit the CPU 102 to perform the proximity-based engine control methods described below. The computing device 100 can also include secondary, additional, or external storage 114, for example, a memory card, flash drive, or any other form of computer readable medium. The installed applications 112 can be stored in whole or in part in the external storage 114 and loaded into the memory 104 as needed for processing.

The computing device 100 can also be in communication with a perception system 116. The perception system 116 can capture data and/or signals for processing by a light detection and ranging (LIDAR) system, a radar system, a sonar system, an image-based sensor system, or any other type of system capable of capturing information specific to the environment surrounding a vehicle for use in performing the engine control methods as described below, including information specific to the vehicle itself and to preceding obstacles such as other vehicles, traffic signs, natural objects, pedestrians, or any other type of preceding obstacle, moving or stationary, and outputting corresponding data and/or signals to the CPU 102.

In the examples described below, the perception system 116 can capture, at least, data from a LIDAR system, radar system, sonar system, image-based sensor system, or any other system that configured to detect the location and speed, in relation the vehicle, of obstacles, objects, or other environmental features including preceding vehicles, traffic signs, pedestrians, etc. The computing device 100 can also be in communication with one or more vehicle systems 118, such as a vehicle braking system or a vehicle propulsion system. The vehicle systems 118 can also be in communication with the perception system 116, the perception system 116 being configured to capture data indicative of performance of the vehicle systems 118.

For example, the perception system 116 can include vehicle-based sensors configured to capture data and/or signals from an engine controller or an engine throttle, components of the vehicle propulsion system. The data and/or signals captured can be indicative of the current position of the engine throttle, that is, to what degree the engine throttle is open and providing fluid, such as air, to the engine of the vehicle. In another example, the perception system 116 can include vehicle-based sensors configured to capture data and/or signals from a brake controller, a brake switch, or a brake pedal, components of a vehicle braking system, indicative of whether the brakes of the vehicle are being applied, for example, by the driver manually or by a hydraulic modulation unit automatically in conjunction with an automatic braking system such as an anti-lock braking system (ABS) or a cruise control system. In another example, the perception system 116 can include wheel speed sensors configured to receive wheel speed information in order to determine vehicle acceleration, that is, whether the vehicle is increasing in speed over time.

Figure 2:
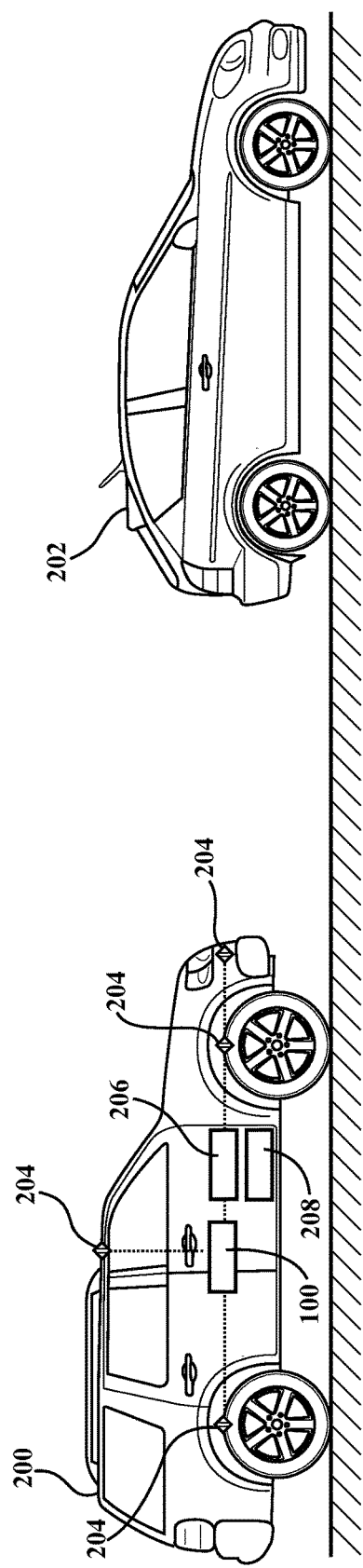
FIG. 2 is a side view of a vehicle including the computing device of FIG. 1 traveling proximate to a preceding vehicle.

FIG. 2 is a side view of a vehicle 200 including the computing device 100 of FIG. 1 traveling proximate to a preceding vehicle 202. The computing device 100 can be located within the vehicle 200 as shown or can be located remotely from the vehicle 200 in an alternate location (not shown). If the computing device 100 is located remotely from the vehicle 200, the vehicle 200 can include the capability of communicating with the computing device 100.

The vehicle 200 can include a plurality of sensors 204 in communication with the perception system 116 of FIG. 1, such as wheel speed sensors within the wheel wells of the vehicle 200 and LIDAR, radar, or sonar-based sensors located on the roof of the vehicle 200 or along the front fascia of the vehicle 200 as shown. Various sensors 204 can determine the acceleration of the vehicle 200, the distance between the vehicle 200 and the preceding vehicle 202, and the speed of both the vehicle 200 and the preceding vehicle 202 in order to determine relative speed between the vehicle 200 and the preceding vehicle 202 (or any other preceding obstacle) and provide this information to the computing device 100.

The computing device 100 can also be in communication with an engine controller 206 as shown, or any other component of a vehicle propulsion system configured to provide an indication of a throttle position for an engine throttle. The throttle position is indicative of the amount of air (or other fluid) being provided to the engine of the vehicle 200, and in the case of an internal combustion engine, can be measured in degrees open or percentage open, with higher values indicative of larger amounts of fluid being provided to the engine. The throttle position can thus be directly correlated to the acceleration of the vehicle 200. Finally, the computing device 100 can be in communication with a brake controller 208 as shown, or any other vehicle brake system components, such as a brake pedal or a brake switch, configured to provide an indication of brake application, that is, whether the vehicle brakes are being applied.

Figure 3:
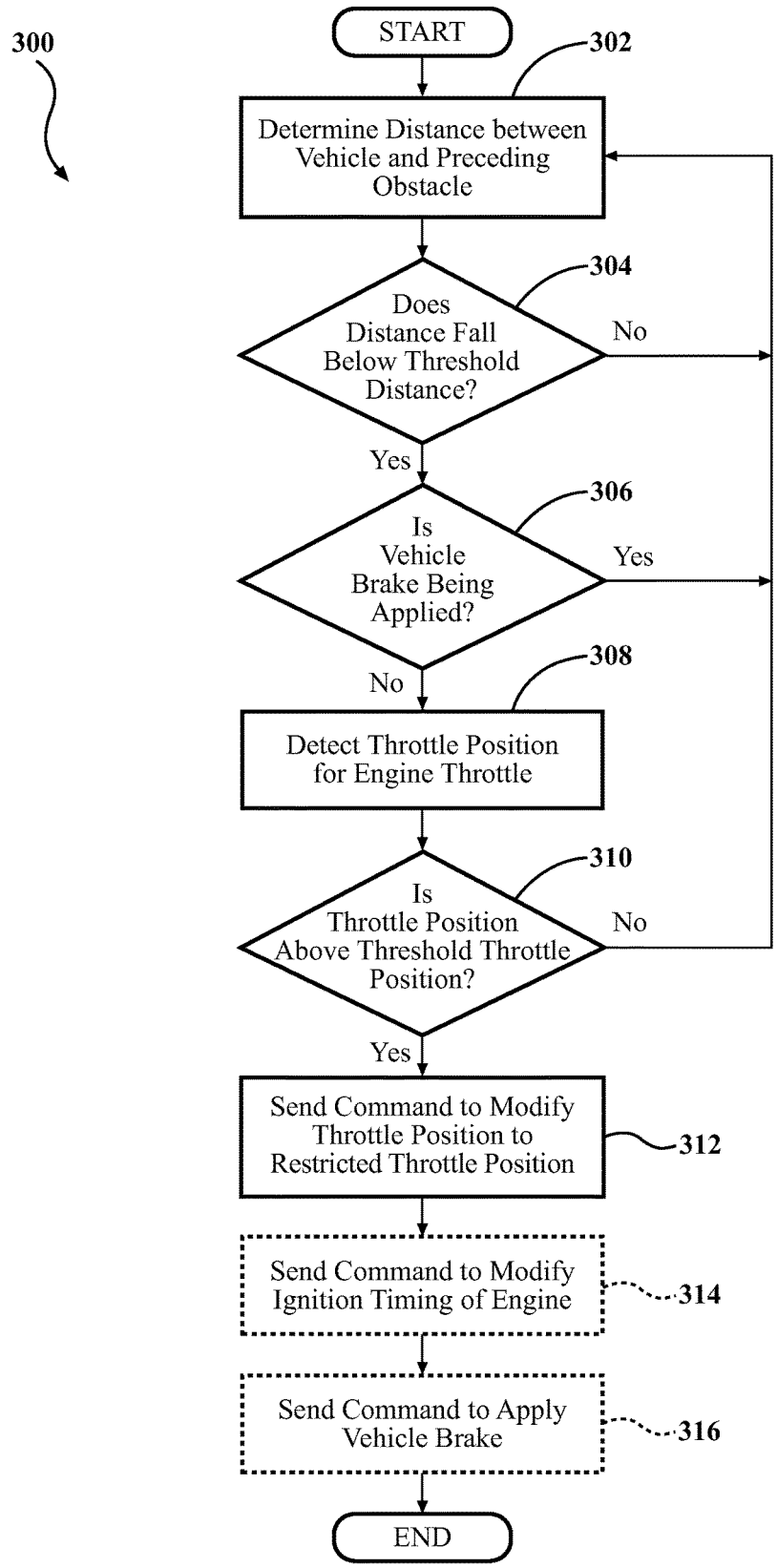
FIG. 3 is flowchart of an exemplary proximity-based engine control process implemented by the vehicle of FIG. 2 and the computing device of FIG. 1.

FIG. 3 is flowchart of an exemplary proximity-based engine control process 300 implemented by the vehicle 200 of FIG. 2 and the computing device 100 of FIG. 1. In step 302 of the process 300, the computing device 100 can determine a distance between the vehicle 200 and a preceding obstacle, such as the preceding vehicle 202 of FIG. 2. The distance can be calculated based on input from the various vehicle sensors 204, the vehicle sensors 204 being in communication with, for example, image-based systems, LIDAR systems, sonar systems, or radar systems, any of which could be used to determine the distance between the vehicle 200 and a preceding obstacle.

In decision block 304 of the process 300, the computing device 100 can determine, using, for example, an engine control algorithm within an application 112 stored in the memory 104 of the computing device 100, whether the distance between the vehicle 200 and the preceding obstacle, in this example, the preceding vehicle 202, is below a threshold distance. The threshold distance can be based, for example, on the speed of the vehicle 200, the speed of the preceding vehicle 202, or both, that is, the relative speed between the vehicle 200 and the preceding vehicle 202.

In the example of FIG. 2, the vehicle 200 is spaced from the preceding vehicle 202 by approximately one vehicle length. If the speed of the vehicle 200 is very low, such as would be the case in a dense urban traffic environment, the threshold distance between the vehicle 200 and the preceding vehicle 202 can be set as a short distance, as safe operation of the vehicle 200 within the low speed environment would allow, for example, for a short braking distance to halt the vehicle 200. If the speed of the vehicle 200 is higher, such as would be the case in general highway cruising, the threshold distance between the vehicle 200 and the preceding vehicle 202 can be set as a longer distance, as safe operation of the vehicle 200 while cruising on the highway will require a longer braking distance to halt the vehicle 200.

The threshold distance can also be based on the relative speed between the vehicle 200 and the preceding vehicle 202. For example, if the preceding vehicle 202 is stopped, the threshold distance can be set as a longer distance than if the preceding vehicle 202 is traveling at the same speed or a higher speed than the vehicle 200. Again, the sensors 204 on the vehicle 200 can be configured to provide the speed of the preceding vehicle 202 for the threshold distance calculation. If the distance between the vehicle 200 and the preceding obstacle is not below the threshold distance, the process 300 returns to step 302 and begins again.

If the distance between the vehicle 200 and the preceding obstacle, for example, the preceding vehicle 202, is below the threshold distance, the process 300 continues to decision block 306. In decision block 306, the computing device 100 can determine whether a vehicle brake is being applied. For example, the computing device 100 can communicate with the brake controller 208 to determine if there is a lack of input to a brake pedal, for example, the driver is not pressing the brake pedal or a brake switch status indicates the lack of braking. If the distance between the vehicle 200 and the preceding vehicle 202 is below the threshold distance but the vehicle brake is being applied, the process 300 returns to step 302 and begins again. In this case, the driver, or another driver assistance system, is already decelerating the vehicle 200 using the braking system.

If the vehicle brake is not being applied, the process 300 continues to step 308. In step 308, the computing device 100 can detect a throttle position for an engine throttle, for example, by communicating with the engine controller 206. As described above, the throttle position can be measured in degrees open or percentage open and is associated with the amount of fluid, for example, air, being supplied to the engine of the vehicle 200. Further, the throttle position can be directly correlated with acceleration of the vehicle 200. The more fluid being supplied to the engine, the higher the acceleration of the vehicle 200.

In decision block 310 of the process 300, the computing device 100 determines whether the throttle position is above a threshold throttle position. The threshold throttle position can be based on the speed of the vehicle 200, the speed of the preceding obstacle, such as the preceding vehicle 202 of FIG. 2, or both. For example, in the case of a dense urban traffic environment where the vehicle 202 is completely stopped, and the preceding vehicle 202 is also completely stopped, the threshold throttle position could be an idle throttle position, such as five percent open as is required to retain engine idle. If the throttle position of the vehicle 200 is not above the threshold throttle position, the process 300 returns to step 302 and starts again.

If the throttle position is above the threshold throttle position, the process 300 continues to step 312, and the computing device 100 can send a command to modify the throttle position to a restricted throttle position. The restricted throttle position can be configured to reduce acceleration of the vehicle 200. In the example of stopped traffic in a dense urban environment, the restricted throttle position can be a five percent open throttle position as would be consistent with engine idle. In another example, such as cruising at highway speeds, the restricted throttle position can be configured to change the acceleration of the vehicle 200 to two times the acceleration of gravity, capable of reducing the acceleration of the vehicle 200. The restricted throttle position can also be dependent upon the speed of the vehicle 200, the speed of a preceding obstacle, or both.

The engine control system described here does not require direct interaction with driver interfaces. If the threshold distance between the vehicle 200 and the preceding obstacle is below the threshold distance, and the vehicle brake is not being applied, the throttle position can be changed to reduce the acceleration of the vehicle 200 without the need to counteract, for example, any input to the accelerator pedal by the driver. After step 312, the process 300 can end. Alternatively, for example, if additional engine control, or other vehicle system controls are required to further reduce the acceleration of the vehicle 200, the process 300 can continue to optional step 314.

In optional step 314, if the throttle position is above the threshold throttle position, the computing device 100 can send a command, for example, to the engine controller 206, to modify ignition timing of the engine of the vehicle 200. By modifying the ignition timing, for example, using spark retard, the acceleration of the vehicle 200 can be reduced by modifying the output of the engine. Step 314 can be used in conjunction with or in place of step 312 to reduce acceleration of the vehicle. After step 314, the process 300 can end. Alternatively, if additional control, for example, using the vehicle braking system, is required to further reduce the acceleration of the vehicle 200, the process 300 can continue to optional step 316.

In optional step 316, if the throttle position is above the threshold throttle position, the computing device 100 can send a command, for example, to the brake controller 208, to apply a vehicle brake to decelerate the vehicle 200. Optional step 316 can be used in conjunction with steps 312 and 314 to reduce the acceleration of the vehicle 200. One benefit of the proximity-based engine control system described here is that the initial reduction in acceleration occurs in step 312, with the throttle position being modified to reduce the acceleration of the vehicle 200. By directly interacting with the engine throttle to reduce acceleration, reliance on manual systems that require, for example, push back on an accelerator pedal can be avoided. Further, the proximity-based engine control system described here can reduce acceleration even when other driver assistance systems, such as cruise control, are automatically directing actions of a vehicle propulsion system or a vehicle braking system without input from the driver.

The foregoing description relates to what are presently considered to be the most practical embodiments. It is to be understood, however, that the disclosure is not to be limited to these embodiments but, on the contrary, is intended to cover various modifications and equivalent arrangements included within the spirit and scope of the appended claims. For example, in the embodiments described above, the vehicle is generally described an automobile. However, the vehicle is not limited to an automobile, as the system can also be implemented with other vehicles that are generally controlled by driver assistance systems or a driver, or operator, such as boats, construction vehicles, etc. The scope of the claims is thus to be accorded the broadest interpretation so as to encompass all such modifications and equivalent structures.

What is claimed is:

1. A method of proximity-based engine control for a vehicle that does not require direct interaction with a driver interface, the method comprising:
   determining a distance between the vehicle and a preceding obstacle;
   if the distance between the vehicle and the preceding obstacle is below a threshold distance, communicate with a brake controller to determine whether a vehicle brake is being applied;
   if the vehicle brake is not being applied, detecting a throttle position for an engine throttle; and
   if the throttle position is above a threshold throttle position, sending a command to modify the throttle position to a restricted throttle position without input from the driver.

2. The method of claim 1, wherein the threshold distance is based on at least one of a speed of the vehicle and a speed of the preceding obstacle.

3. The method of claim 1, wherein determining whether the vehicle brake is being applied includes at least one of determining a lack of input to a brake pedal and determining a brake switch status.

4. The method of claim 1, wherein the threshold throttle position is based on at least one of a speed of the vehicle and a speed of the preceding obstacle.

5. The method of claim 1, wherein the restricted throttle position is configured to reduce acceleration of the vehicle.

6. The method of claim 1, further comprising:
if the throttle position is above the threshold throttle position, sending a command to modify ignition timing for a vehicle engine to reduce acceleration of the vehicle.

7. The method of claim 1, further comprising:
if the throttle position is above the threshold throttle position, sending a command to apply the vehicle brake.

8. A computing device, comprising:
one or more processors for controlling operations of the computing device; and
a memory for storing data and program instructions used by the one or more processors, wherein the one or more processors are configured to execute instructions stored in the memory to:
determine a distance between a vehicle and a preceding obstacle;
if the distance between the vehicle and the preceding obstacle is below a threshold distance, communicate with a brake controller to determine whether a vehicle brake is being applied;
if the vehicle brake is not being applied, detect a throttle position for an engine throttle; and
if the throttle position is above a threshold throttle position, send a command to modify the throttle position to a restricted throttle position without input from the driver.

9. The computing device of claim 8, wherein the threshold distance is based on at least one of a speed of the vehicle and a speed of the preceding obstacle.

10. The computing device of claim 8, wherein determining whether the vehicle brake is being applied includes at least one of determining a lack of input to a brake pedal and determining a brake switch status.

11. The computing device of claim 8, wherein the threshold throttle position is based on at least one of a speed of the vehicle and a speed of the preceding obstacle.

12. The computing device of claim 8, wherein the restricted throttle position is configured to reduce acceleration of the vehicle.

13. The computing device of claim 8, wherein the one or more processors are further configured to:
if the throttle position is above the threshold throttle position, send a command to modify ignition timing for a vehicle engine to reduce acceleration of the vehicle.

14. The computing device of claim 8, wherein the one or more processors are further configured to:
if the throttle position is above the threshold throttle position, send a command to apply the vehicle brake.

15. A vehicle, comprising:
an engine throttle;
a vehicle brake; and
a computing device in communication with the engine throttle and the vehicle brake, comprising:
one or more processors for controlling operations of the computing device; and
a memory for storing data and program instructions used by the one or more processors, wherein the one or more processors are configured to execute instructions stored in the memory to:
determine a distance between the vehicle and a preceding obstacle;
if the distance between the vehicle and the preceding obstacle is below a threshold distance, communicate with a brake controller to determine whether the vehicle brake is being applied;
if the vehicle brake is not being applied, detect a throttle position for the engine throttle; and
if the throttle position is above a threshold throttle position, send a command to modify the throttle position to a restricted throttle position without input from the driver.

16. The vehicle of claim 15, wherein the threshold distance is based on at least one of a speed of the vehicle and a speed of the preceding obstacle.

17. The vehicle of claim 15, wherein the threshold throttle position is based on at least one of a speed of the vehicle and a speed of the preceding obstacle.

18. The vehicle of claim 15, wherein the restricted throttle position is configured to reduce acceleration of the vehicle.

19. The vehicle of claim 15, wherein the one or more processors are further configured to:
if the throttle position is above the threshold throttle position, send a command to modify ignition timing for a vehicle engine to reduce acceleration of the vehicle.

20. The vehicle of claim 15, wherein the one or more processors are further configured to:
if the throttle position is above the threshold throttle position, send a command to apply the vehicle brake.

* * * * *